US012656118B2

(12) United States Patent
Ponceau et al.

(10) Patent No.: US 12,656,118 B2
(45) Date of Patent: Jun. 16, 2026

(54) DEVICE FOR MEASURING ANGULAR ERRORS IN THE INCLINATION OF THE TRUE AXIS OF ROTATION OF A ROTARY ELEMENT, AND ASSOCIATED METHOD

(71) Applicant: EXAIL, Saint-Germain-en-Laye (FR)

(72) Inventors: Damien Ponceau, Saint-Germain-en-Laye (FR); Mehdi Bussutil, Saint-Germain-en-Laye (FR); Bernard Vau, Saint-Germain-en-Laye (FR); Clément Pinzio, Saint-Germain-en-Laye (FR)

(73) Assignee: EXAIL, Saint-Germain-en-Laye (FR)

( * ) Notice: Subject to any disclaimer, the term of this patent is extended or adjusted under 35 U.S.C. 154(b) by 303 days.

(21) Appl. No.: 18/690,182

(22) PCT Filed: Sep. 7, 2022

(86) PCT No.: PCT/EP2022/074873
§ 371 (c)(1),
(2) Date: Mar. 7, 2024

(87) PCT Pub. No.: WO2023/036825
PCT Pub. Date: Mar. 16, 2023

(65) Prior Publication Data
US 2025/0137784 A1 May 1, 2025

(30) Foreign Application Priority Data
Sep. 8, 2021 (FR) ....................................... 2109421

(51) Int. Cl.
*G01C 19/44* (2006.01)
*G01B 21/24* (2006.01)
(Continued)

(52) U.S. Cl.
CPC ............. *G01C 19/44* (2013.01); *G01B 21/24* (2013.01); *G01C 9/06* (2013.01); *G01C 19/005* (2022.01);
(Continued)

(58) Field of Classification Search
CPC ....... G01B 21/24; G01C 19/005; G01C 19/44
See application file for complete search history.

(56) References Cited

U.S. PATENT DOCUMENTS

| 6,435,044 | B1 | 8/2002 | Adolph | |
|---|---|---|---|---|
| 2003/0154792 | A1* | 8/2003 | Katayama | ............. G01S 15/872 73/602 |

(Continued)

FOREIGN PATENT DOCUMENTS

| CN | 111220114 B | 2/2021 |
|---|---|---|

OTHER PUBLICATIONS

International Search Report for PCT/EP2022/074873 mailed Nov. 25, 2022, 7 pages.
Written Opinion of the ISA for PCT/EP2022/074873 mailed Nov. 25, 2022, 9 pages.

*Primary Examiner* — Eric S. McCall
(74) *Attorney, Agent, or Firm* — NIXON & VANDERHYE

(57) ABSTRACT

The invention relates to a device (100) for measuring the angular errors in the inclination of a real axis of rotation (204) of a rotary element (101), the device comprising control electronics (111) controlling the rotation of the rotary element (101) about its real axis of rotation (204), a first and a second rotation sensor (112a, 112b) for obtaining angular velocities about two measurement axes (302, 304) which are orthogonal to one another and both orthogonal to the real axis of rotation (204), a third rotation sensor (112c) making it possible to obtain the angular position and angular velocity of the rotation element (101) about its real axis of rotation (204)
(Continued)

Averaging the measurements

Identifying the orthogonality errors of the rotation sensors

Correcting the rotation sensor measurements for the components resulting from the previously identified orthogonality errors Estimating the amplitude of the Earth's rotational velocity vector projection and the initial headings of the rotation sensors (North alignment)

Correcting the rotation sensor measurements for the components resulting from the Earth's rotational velocity vector projections onto the rotation sensors Integrating the rotation sensor measurements to obtain the two components of angular error of inclination of the rotating axis (204), at least two of the aforementioned sensors being inertial sensors making it possible to obtain projections of the vector of the speed of rotation of the Earth onto at least two axes of projection, an acquisition unit (113), a measurements-storage memory (114), a computation unit (115) configured to compute, from the angular positions and velocities obtained from the aforesaid sensors, the angular errors in the inclination of the real axis of rotation (204) of the rotary element (101).

20 Claims, 4 Drawing Sheets

(51) Int. Cl.
    *G01C 9/06*         (2006.01)
    *G01C 19/00*      (2013.01)

(52) U.S. Cl.
    CPC ................. *G01C 2009/064* (2013.01); *G01C 2009/066* (2013.01)

(56) References Cited

U.S. PATENT DOCUMENTS

| | | | |
|---|---|---|---|
| 2003/0156585 A1* | 8/2003 | Minami | G01C 9/00 |
| | | | 370/392 |
| 2003/0236627 A1 | 12/2003 | Estes | |
| 2005/0022402 A1 | 2/2005 | Ash et al. | |
| 2007/0175055 A1 | 8/2007 | Estes et al. | |
| 2018/0075669 A1* | 3/2018 | Yeh | G06F 16/29 |
| 2025/0244127 A1* | 7/2025 | Tomioka | G01C 19/38 |

* cited by examiner

[Fig.1]
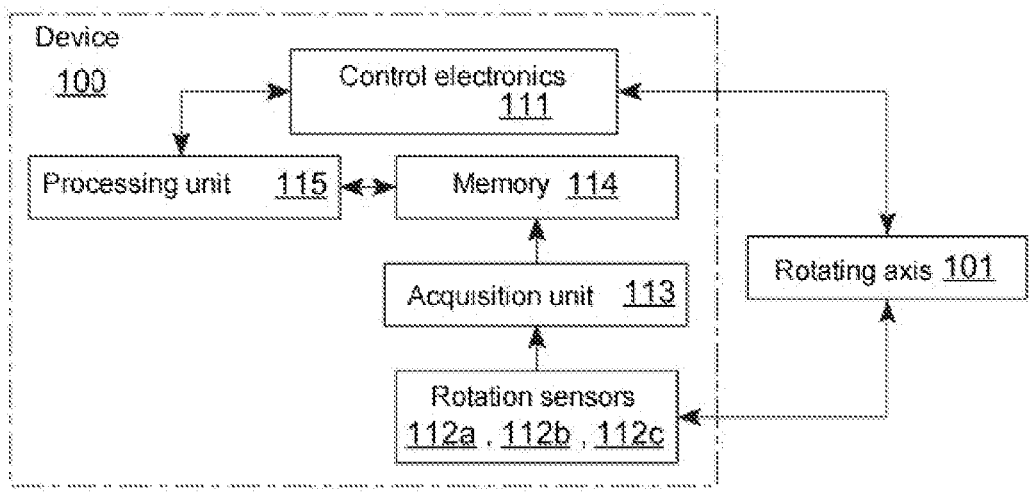
[Fig.2]
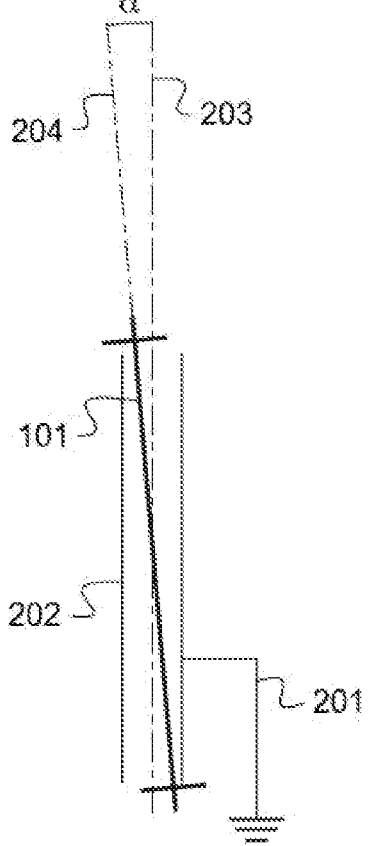

[Fig 3]
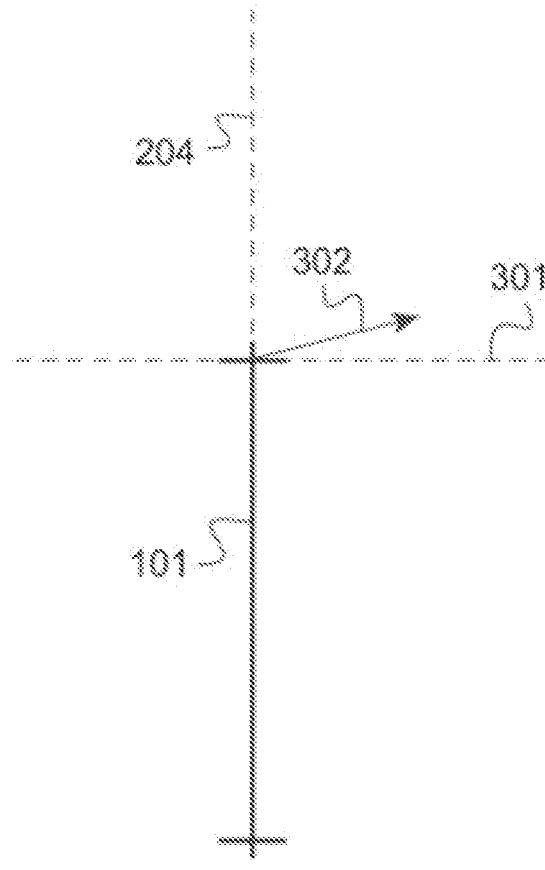
[Fig 4]
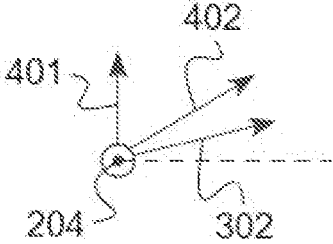

[Fig.5]
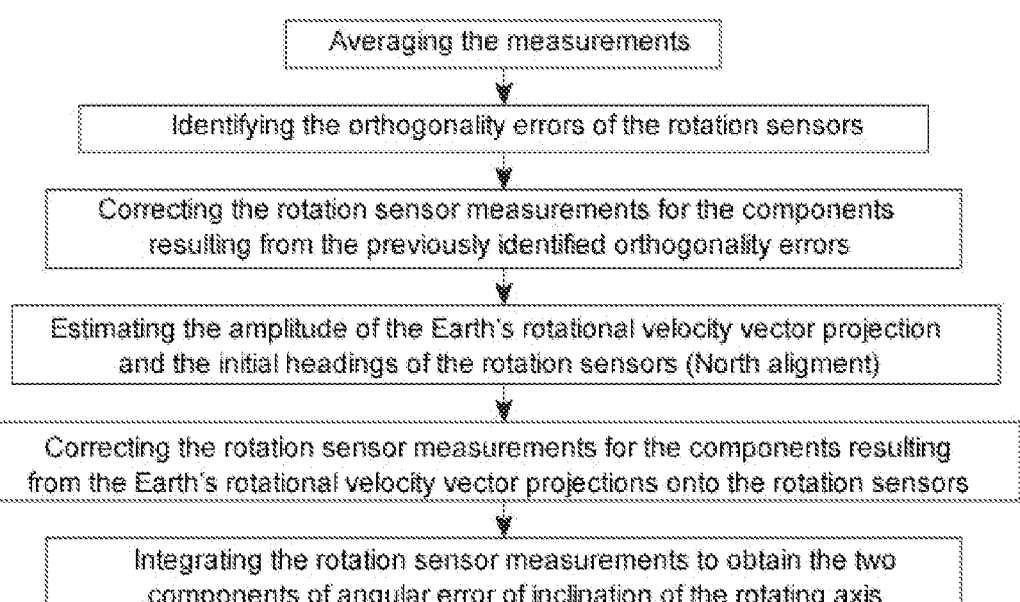
[Fig.6]
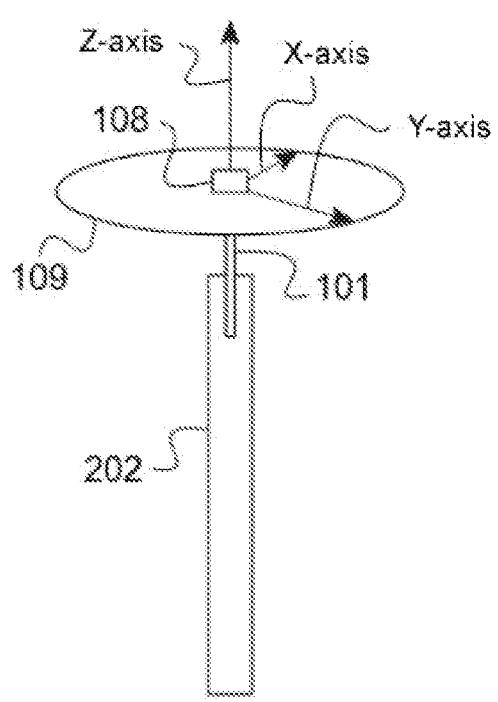

[Fig. 7]
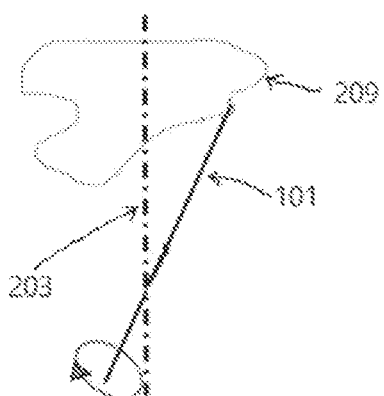

DEVICE FOR MEASURING ANGULAR ERRORS IN THE INCLINATION OF THE TRUE AXIS OF ROTATION OF A ROTARY ELEMENT, AND ASSOCIATED METHOD

CROSS-REFERENCE TO RELATED APPLICATIONS

This application is the U.S. national phase of International Application No. PCT/EP2022/074873 filed Sep. 7, 2022 which designated the U.S. and claims priority to FR Patent Application No. 2109421 filed Sep. 8, 2021, the entire contents of each of which are hereby incorporated by reference.

TECHNICAL FIELD

The present invention generally relates to the field of precision equipment with rotary elements and characterization of these latter by measurements so that their imperfections can be taken into account and, advantageously, corrected. More particularly, it relates to a device for measuring angular errors of inclination of a real axis of rotation of a rotary element and to a method for characterizing a rotary element and more particularly to the measurement of the deterministic component of the angular error of inclination of this rotary element. The invention thus enables to determine the precise orientation of a real axis of rotation of a rotary element.

BACKGROUND OF THE INVENTION

Within the framework of the invention, "rotary element" refers to any mechanical system with at least one rotational degree of freedom about a reference axis assumed to be stationary in a geocentric reference frame during the observation time considered. A rotary element is considered precise if its angular error of inclination in relation to its reference axis is less than a few tens of arcsec.

In practice, in metrology equipment such as a motion simulator, or machining equipment, the rotary element that has a main axis forming the real axis of rotation of said rotary element can have an inclination in relation to the reference axis with which it is supposed to be aligned. Indeed, although in a piece of equipment, a rotary element can be installed very precisely along a reference axis, there may still be an inclination/angular error between the reference axis and the real axis of rotation.

This angular error of inclination between the real axis of rotation and the reference axis has a component that depends on the angular position of the real axis of rotation and a component independent of the angular position of the real axis of rotation and creates a movement in space here called "wobble" as the rotary element rotates.

When the rotary element relates to metrology or machining equipment, knowing the component depending on the angular position of the real axis of rotation of this angular error of inclination may enable to significantly improve the quality of the equipment's work by taking this deterministic component into account a priori or a posteriori during the equipment's activity.

Up to now, optical measuring devices, such as scopes, or angular measuring devices, such as inclinometers, have been used to characterize this angular error, which depends on the angular position of the real axis of rotation.

SUMMARY OF THE INVENTION

It is proposed according to the invention a solution for characterizing a rotary element with respect to its reference axis by calculation of the angular errors of inclination of the real axis of rotation of the rotary element, and more generally the precise position of the real axis of rotation of the rotary element in a determined reference frame, this rotary element being in metrology or machining equipment, by implementing calculations based on rotation sensor measurements, without requiring operator intervention to carry out these measurements. Characterization can thus be automated. The sensors and characterization calculation means may or may not be left permanently in the equipment after the characterization has been carried out. The metrology equipment may in particular be a motion simulator, which can also incorporate several rotary elements, each of which may be characterized. Moreover, the precise position of the real axis of rotation of the rotary element that can be obtained after measurement of the angular errors of inclination of said real axis of rotation of the rotary element is calculated in space in a determined reference frame and it is defined as a function of the angular rotational position of the rotary element or as a function of time for a rotating rotary element.

Therefore, an object of the invention is a device for measuring and estimating angular errors of inclination $\alpha_x(\theta)$, $\alpha_y(\theta)$, of a real axis of rotation of a rotary element in relation to a reference axis of the rotary element, the rotary element being installed in metrology or machining equipment in such a way as to be aligned as closely as possible with the reference axis, the real axis of rotation being able to have a variable inclination in relation to the reference axis of the rotary element as a function of the angular position $\theta$ of the real axis of rotation of the rotary element, said angularly variable inclination or "wobble" corresponding to the angular errors of inclination of the real axis of rotation of the rotary element in relation to the reference axis of the rotary element, the device including:

- control electronics for controlling the rotation of the rotary element about its real axis of rotation;
- a first and a second rotation sensors for obtaining respectively angular velocities, including that of the rotary element, about two measurement axes which are orthogonal to one another and both orthogonal to the real axis of rotation;
- a third rotation sensor for obtaining the angular position and the angular velocity of the rotary element about its real axis of rotation;
- at least two of said above-mentioned sensors being inertial and enabling to obtain projections of the Earth's rotational velocity vector onto at least two projection axes,
- an acquisition unit configured to acquire measurements made by the above-mentioned sensors while the rotary element carries out at least one series of periodic oscillations resulting in reversals of the direction of rotation of the rotary element;
- a memory for storing the measurements of the above-mentioned sensors;
- a calculation unit configured to calculate, from the angular velocities and positions obtained from the above-mentioned sensors, the angular errors of inclination $\alpha_x(\theta)$, $\alpha_y(\theta)$ of the real axis of rotation of the rotary element in relation to the reference axis of the rotary element and as a function of the angular position $\theta$ of the real axis of rotation of the rotary element.

Other Non-Limiting and Advantageous Features of the Device According to the Invention, Taken Individually or According to all the Technically Possible Combinations, are the Following:

the calculation unit is moreover configured to calculate the precise orientation of the real axis of rotation, the three above-mentioned sensors, the first, the second and the third rotation sensors are inertial and enable to obtain measurements of the Earth's rotational velocity vector along three projection axes, two of the three projection axes being the two measurement axes of the first and the second rotation sensors, and the third projection axis being orthogonal to the two previous ones, and aligned with the real axis of rotation, the third projection axis is parallel to the real axis of rotation, the third projection axis is aligned with the real axis of rotation, the rotary element is installed in an equipment in such a way that is real axis of rotation is aligned with a reference axis, an inclination/angular error being however liable to exist between the reference axis and the real axis of rotation, the equipment is metrology equipment, the equipment is machining equipment, the acquisition unit is configured to carry out the synchronous acquisition of the measurements made by the rotation sensors, at least two of the rotation sensors enable to measure the projection of the Earth's rotational velocity, the first and the second rotation sensors enable to measure the projection of the Earth's rotational velocity, the first, second and third rotation sensors enable to measure the projection of the Earth's rotational velocity, at least one of the three rotation sensors incorporates a gyrometer, at least two of the three rotation sensors incorporate a gyrometer, said at least two inertial sensors that enable to obtain the projections of the Earth's rotational velocity vector onto at least two projection axes are the first and the second rotation sensors and the two measurement axes of the first and the second rotation sensors are merged with said at least two projection axes, in the case of a rotation sensor incorporating a gyrometer, the measurement axis is the sensitive axis of the gyrometer, in the case of a rotation sensor incorporating a gyrometer arranged within an inertial unit, the measurement axis corresponding to the inertial unit is the sensitive axis of the gyrometer, in the case of a rotation sensor incorporating a gyrometer arranged within an inertial unit, the measurement axis corresponding to the inertial unit may be different from the sensitive axis of the gyrometer, the precise orientation of the real axis of rotation is the North alignment of the real axis of rotation of the rotary element, the precise orientation of the real axis of rotation is the inclination between the real axis of rotation and a reference axis, advantageously, the reference axis is the reference axis of the rotary element, in a particular modality, the reference axis of the rotary element is vertical, the main axis of the rotary element being arranged so as to be vertical, the calculation unit is configured to calculate from the measurements of the rotation sensors at least one of:

the North alignment of the real axis of rotation,

the inclination between a reference axis and the real axis of rotation, the first and the second rotation sensors each incorporate a gyrometer, the third rotation sensor that enables to obtain the angular position and the angular velocity of the rotary element about its real axis of rotation measures at least one of the angular position and the angular velocity of the rotary element, and in the case where one of the angular position and the angular velocity of the rotary element is not measured, the latter is calculated, preferably in the calculation unit, the third rotation sensor that enables to obtain the angular position and the angular velocity of the rotary element about its real axis of rotation produces measurements for calculating, preferably in the calculation unit, the angular position and the angular velocity of the rotary element, the third rotation sensor incorporates a gyrometer integral with the rotary element and installed in such a way that its sensitive axis is aligned with the real axis of rotation of the rotary element and the calculation unit is configured to calculate the angular rotational velocity and the angular position of the rotary element based on measurements of the third rotation sensor, the first and the second rotation sensors each incorporate a gyrometer integral with the rotary element and the third rotation sensor incorporates a gyrometer integral with the rotary element and installed in such a way that its sensitive axis is aligned with the real axis of rotation and the calculation unit is configured to calculate the angular rotational velocity and the angular position of the rotary element based on measurements made by the third rotation sensor, in a device in which the first, the second and the third rotation sensors each incorporate a gyrometer integral with the rotary element, these three gyrometers are within an inertial unit, the inertial unit produces measurements of angular rotational velocities along an orthonormal trihedron, in the inertial unit, the three measurement axes of the three gyrometers are aligned along the three axes of an orthonormal trihedron, in the inertial unit, the three measurement axes of the three gyrometers are not all aligned along the three axes of an orthonormal trihedron, in the inertial unit, the three measurement axes of the three gyrometers are not all aligned along the three axes of an orthonormal trihedron, the gyrometers being arranged in a pyramid shape, in the inertial unit, the three measurement axes of the three gyrometers of which are not all aligned along the three axes of an orthonormal trihedron, the measurements are corrected in such a way that the inertial unit produces measurements of angular rotational velocities along an orthonormal trihedron, a test plate is integral with the rotary element, the inertial unit is attached to test plate, the third rotation sensor is a specific measurement system that enables to produce directly and/or via calculations the angular rotational velocity and the angular position of the rotary element, said specific measurement system being integral with a fixed part of equipment, the first and the second rotation sensors each incorporate a gyrometer integral with the rotary element and the third rotation sensor is a specific measurement system that enables to produce directly and/or via calculations the angular rotational velocity and the angular position of the rotary element, said specific measurement system being integral with a fixed part of equipment incorporating the rotary element, the specific measurement system incorporates no gyrometer, the specific measurement system incorporates a single sensor enabling to produce the angular rotational velocity and the angular position of the rotary element, the specific measurement system incorporates a single sensor enabling to produce directly the angular position of the rotary element, the angular rotational velocity of the rotary element being obtained by calculations based on the measurement of the angular position of the rotary element, the specific measurement system incorporates two sensors, one for measuring the angular rotational velocity of the rotary element and one for measuring the angular position of the rotary element, the specific measurement system incorporates an optical encoder, the specific measurement system incorporates an inductive encoder, the specific measurement system incorporates a magnetic encoder, the specific measurement system incorporates an interferometric rotation measurement system other than a gyrometer, the angular rotational velocity or the angular position of the rotary element obtained by calculations from measurements made by the specific measurement system are produced by the specific measurement system that incorporates calculation means, the angular rotational velocity or the angular position of the rotary element obtained by calculations from measurements of the specific measurement system are produced by the calculation unit, the first and the second rotation sensors each incorporate a gyrometer integral with the rotary element and the device incorporates a third rotation sensor incorporating a gyrometer and a specific measurement system, the gyrometer of the third rotation sensor being arranged in such a way that its sensitive axis is aligned with the real axis of rotation and the calculation unit being configured to calculate at least one of the angular rotational velocity and the angular position of the rotary element based on measurements of the gyrometer of the third rotation sensor, and said specific measurement system enables to produce directly and/or via calculations at least one of the angular rotational velocity and the angular position of the rotary element, said specific measurement system being integral with a fixed part of equipment incorporating the rotary element and wherein the calculation unit is configured to use the angular rotational velocities and the angular positions of the rotary element obtained from measurements of the gyrometer of the third rotation sensor and the specific measurement system, the calculation unit is configured to calculate, from the measurements of the rotation sensors, an inclination angle between the real axis of rotation and the reference axis, the reference axis is vertical, the reference axis is vertical and the first and the second rotation sensors, which each incorporate a gyrometer, have their measurement axes arranged in a horizontal plane, the reference axis is vertical and the device incorporates three gyrometers, the reference axis is vertical and the measurement device incorporates three gyrometers and a specific measurement system enabling to produce directly and/or via calculations the angular rotational velocity and the angular position of the rotary element, the reference axis is vertical and the measurement device incorporates two gyrometers with measurement axes in a horizontal plane and a specific measurement system enabling to produce directly and/or via calculations the angular rotational velocity and the angular position of the rotary element, the reference axis is horizontal, the reference axis is horizontal and the first and the second rotation sensors, which each incorporate a gyrometer, have their measurement axes arranged in a vertical plane, the reference axis is horizontal and the measurement device incorporates three gyrometers, the reference axis is horizontal and the measurement device incorporates three gyrometers and a specific measurement system enabling to produce directly and/or via calculations the angular rotational velocity and the angular position of the rotary element, the reference axis is horizontal and the measurement device incorporates two gyrometers and a specific measurement system enabling to produce directly and/or via calculations the angular rotational velocity and the angular position of the rotary element.

The invention also relates to a method for measuring and estimating angular errors of inclination $\alpha_x(\theta)$, $\alpha_y(\theta)$, of a real axis of rotation of a rotary element in relation to a reference axis of the rotary element, the rotary element being installed in metrology or machining equipment in such a way as to be aligned as closely as possible with the reference axis, the real axis of rotation being able to have a variable inclination in relation to the reference axis of the rotary element as a function of the angular position $\theta$ of the real axis of the rotary element, said angularly variable inclination or "wobble" corresponding to the angular errors of inclination of the real axis of rotation of the rotary element in relation to the reference axis of the rotary element, incorporating the following steps:

measuring the angular velocities of the rotary element about two measurement axes which are orthogonal to one another and both orthogonal to the real axis of rotation;

measuring the angular position and the angular velocity of the rotary element about its real axis of rotation;

measuring the projections of the Earth's rotational velocity onto at least two projection axes, said measurements being made while the rotary element carries out at least one series of periodic oscillations resulting in reversals of the direction of rotation of the rotary element;

calculating, from measurements made at the previous steps, the angular errors of inclination $\alpha_x(\theta)$, $\alpha_y(\theta)$ of the real axis of rotation of the rotary element in relation to the reference axis of the rotary element and as a function of the angular position $\theta$ of the real axis of rotation of the rotary element.

The method can be adapted to all the procedural possibilities made possible by the described means of the invention and the device thereof.

In particular, other non-limiting and advantageous features of the method according to the invention, taken individually or according to all the technically possible combinations, are the following:

the precise orientation of the real axis of rotation is further calculated, the precise orientation of the real axis of rotation that is calculated is at least one of:

the North alignment of the real axis of rotation, the inclination between the real axis of rotation and a reference axis, the reference axis being advantageously the reference axis of the rotary element, a calculation unit is implemented, which is configured to calculate from the measurements of the rotation sensors at least one of the North alignment of the real axis of rotation, and the inclination between a reference axis and the reference axis, the method further includes the following steps:—carrying out periodic measurements at determined rotational velocities of the rotary element; —averaging the periodic measurements; —deducing therefrom errors of orthogonality of the two sensitive axes;

correcting the measurements of the angular velocities of the rotary element about the two axes of measurement for components resulting from the identified errors of orthogonality, the method further includes a step of correcting the measurements of the angular velocities of the rotary element about the axes of measurement of the components resulting from the projections of the Earth's rotational velocity vector and integrating said so-corrected measurements of the angular velocities to calculate the angular errors of inclination of the real axis of rotation of the rotary element in relation to the reference axis of the rotary element and as a function of the angular position θ of the real axis of rotation of the rotary element, the determined rotational velocities are constant rotational velocities of the rotary element, the determined rotational velocities are variable rotational velocities of the rotary element, in particular velocities varying sinusoidally with time, the projection axes onto which the Earth's rotational velocity is measured are merged with at least two axes among the two measurement axes and the real axis of rotation, two gyrometers are implemented for the first and the second rotation sensors, for the third rotation sensor, a gyrometer is implemented, which is integral with the rotary element and installed in such a way that its sensitive axis is aligned with the real axis of rotation of the rotary element and the calculation unit calculating the angular rotational velocity and the angular position of the rotary element based on measurements of the third rotation sensor, for the third rotation sensor, a specific measurement system is implemented, which enables to produce directly and/or via calculations the angular rotational velocity and the angular position of the rotary element, said specific measurement system being integral with a fixed part of equipment, a first, a second and a third rotation sensors, which are three gyrometers, are implemented, the real axis of rotation being aligned along a vertical reference z-axis of an orthonormal trihedron of axes x, y, z, the first $g_x$, the second $g_y$ and the third $g_z$ gyrometers carrying out measurements along the axes x, y, z, respectively, and velocities $w_x$, $w_y$ due to the inclination between the reference axis and the real axis of rotation are calculated by the relations:

$$w_x(t) = g_x(t) - \Omega\cos\theta(t)\cos L - m_{1z} \cdot \dot{\theta}(t) - b_x$$

$$w_y(t) = g_y(t) + \Omega\sin\theta(t)\cos L - m_{2z} \cdot \dot{\theta}(t) - b_y$$

where $\Omega$ is the Earth's rotational velocity,

L is the latitude of equipment incorporating the rotary element, $\theta$ is the angular position of the real axis of rotation of the rotary element with respect to the North, $\theta$ is the angular velocity of the rotary element about the real axis of rotation, $m_{1z}$ is the misalignment of the x-axis gyrometer with respect to z-axis, $m_{2z}$ is the misalignment of the y-axis gyrometer with respect to z-axis, $b_x$, $b_y$ the gyrometer biases along x-axis and y-axis, the identifiable terms $m_{1z}$, $m_{2z}$ an$b_x$, $b_y$ being estimated, the inclination angles $\alpha_x(\theta)$, $\alpha_y(\theta)$ between the reference axis and the real axis of rotation as a function of the angular position θ of the rotary element about its real axis of rotation being obtained by implementation of the differential equations:

$$\dot{\alpha}_x(t) = w_x(t)$$

$$\dot{\alpha}_y(t) = w_y(t)$$

the terms $m_{1z}$, $m_{2z}$ and $b_x$, $b_y$ are estimated by linear regression.

BRIEF DESCRIPTION OF DRAWINGS

FIG. 1 schematically shows metrology equipment incorporating a measurement device for characterizing its rotary element, corresponding to an embodiment of the invention, FIG. 2 shows a model of a rotary element in which the equipment frame is represented by thin solid lines and the moving part, i.e. the rotary element, by thick solid lines, the error of inclination between the real axis of rotation represented by dotted lines and the reference axis represented by thin mixed lines having been accentuated to make it easier to understand, FIG. 3 shows a model of the installation of a rotation sensor on a rotary element in a first viewing orientation, the direction and sense of the measurement axis of the rotation sensor being represented by a thin solid line vector, the plane orthogonal to the real axis of rotation being represented by dotted lines and the direction and sense of the measurement axis of the rotation sensor being represented by a thin solid line vector, FIG. 4 shows a model of a rotary element in another viewing orientation, FIG. 5 shows a simplified flow diagram of a method corresponding to an embodiment of the invention, FIG. 6 shows a model of a rotary element in which the test plate is shown incorporating an inertial unit, also called inertial measurement unit, the measurement axes of which being represented, the plate being rotated by the rotary element, and FIG. 7 shows an example of "wobble" schematized by the path in space of a point on a rotary element during the rotation of this rotary element, which has been aligned as closely as possible with a reference axis.

DETAILED DESCRIPTION OF THE INVENTION

The following description in relation with the appended drawings, given by way of non-limiting examples, will allow a good understanding of what the invention consists of and of how it can be implemented.

Generally, as modelled in FIG. 2, the invention applies to a rotary element 101 of equipment, in particular metrology or machining equipment, whose frame 201 is considered fixed on the Earth's surface. The metrology equipment can be a motion simulator as shown in FIG. 6 with its rotary test plate 109 at the end of the rotary element 101 arranged in a journal 202. The rotary element 101 is installed in the journal 202 of the equipment so as to be aligned as closely as possible with a reference axis 203. This rotary element is assumed to be rigid.

A "wobble" example is schematized in FIG. 7 as a path 209 in space of a point of the rotary element 101 during the rotation of this rotary element and despite the fact that the latter had been aligned as closely as possible with the reference axis 203, due to uncertainties in the assembly process. This rotation of the rotary element 101 about its axis is defined by an angle of rotation and is schematized in FIG. 7 by an arrow circle at the base of the rotary element. The rotation angle of the rotary element 101 about its axis makes it possible to define the angular position θ of the rotary element and it is understood that the rotation angle and the angular position θ of the rotary element evolve over time due to the rotation of the rotary element.

Back to FIG. 2, the rotary element 101 is thus in controlled rotation about the reference axis 203 but, due to uncertainties in the assembly process, the real axis of rotation 204 of the rotary element 101 has an angle of inclination with respect to the reference axis 203. This angle of inclination is variable in space and time due to the rotation of the rotary element. This creates a so-called "wobble" motion as the rotary element rotates about its real axis of rotation. In FIG. 2, this inclination is symbolized by an angle α but, in practice, it is in space and several angles are determined with respect to several axes of a determined reference frame and, moreover, these angles are determined as a function of the rotational orientation of the rotary element and/or as a function of time.

In the example that will be detailed hereinafter, for a vertical reference axis, these angles will be $\alpha_x$, $\alpha_y$ ("wobble" angles) along x-axis and y-axis of a reference frame and their declinations $\alpha_x(t)$, $\alpha_y(t)$ and $\alpha_x(\theta)$, $\alpha_y(\theta)$, respectively, as a function of time and of the angular position θ of the rotary element. In FIG. 6, this reference frame corresponds to the measurement axes of an inertial unit 108, also called inertial measurement unit, fixed to the test plate. According to the arrangement of the gyrometers within the inertial unit, the reference frame may correspond or not to the sensitive axes of the gyrometers of the inertial unit. Generally, the inertial unit provides measurements along an orthonormal trihedron and that regardless of the arrangement of the gyrometers in the inertial unit, where the gyrometers can be aligned along the three axes of said orthonormal trihedron or differently within the inertial unit.

The rotation is thus made in reality about the real axis of rotation 204, the position of which can be modelled by two errors of inclination about two axes which are orthogonal to one another and both orthogonal to the reference axis 203.

The invention enables to determine in a device 100 schematized in FIG. 1 the angular error of positioning/installation of a rotary element.

Within the framework of the invention, for the rotary element 101, it is considered that the magnitude of these errors is less than a few tens of arcsec.

It results from these errors, the creation of a "wobble" during the rotation of the rotary element and that the invention proposes to quantify by calculating the angular errors of inclination of the real axis of rotation of the rotary element then, in particular, the precise orientation of the real axis of rotation 204 and that may correspond to the North alignment of the real axis of rotation or to the inclination between the real axis of rotation 204 and, preferentially, the reference axis 203 of the rotary element 101.

Due to the Earth's rotation, in a geocentric reference frame, the rotary element 101 and its frame 201 both rotate about the Earth's axis of rotation.

If we consider, as schematically shown in FIGS. 3 and 4, a rotation sensor, here a third rotation sensor 112c, the measurement axis of which, or sensitive axis in the case of a gyrometer, would be integral and perfectly aligned with the real axis of rotation 204 of the rotary element 101, then this rotation sensor would measure the rotational component of this real axis of rotation 204 (thus of the rotary element) and the Earth's rotation projection onto this real axis of rotation 204. This latter component would of course vary as a function of the two inclination components of the real axis of rotation 204.

If we consider rotation sensors 112a, 112b that may be a first and a second gyrometers each having a sensitive axis (=measurement axis), denoted 302 for the first rotation sensor and 402 for the second rotation sensor, and which are integral with and perfectly orthogonal to the real axis of rotation 204 of the rotary element 101, then these two rotation sensors 112a, 112b would not measure the rotation component of the real axis of rotation 204 but would measure the Earth's rotation projection onto their respective sensitive axes 302, 402.

This latter component (the Earth's rotation projection onto the sensitive axis 302, 402) would of course vary as a function of the two inclination components of the real axis 204 but also as a function of the angular position of the rotary element 101 on its real axis of rotation 204 during its rotation.

Moreover, this latter component would be maximum when the sensitive axis 302, 402 of the corresponding rotation sensor 112a or 112b is aligned with the projection 401 of the Earth's rotational velocity vector in the plane of rotation of the sensitive axis 302, 402 about the rotary element 101. It would then be equal to the projection 401 of the Earth's rotational velocity vector in the plane of rotation of the sensitive axis 302, 402 about the rotary element 101. Conversely, this latter component would be zero when the sensitive axis 302, 402 of the rotation sensor 112a or 112b is orthogonal to the projection 401 of the Earth's rotational velocity vector in the plane of rotation of the sensitive axis 302, 402 about the rotary element 101.

The invention enables, in several embodiments, to identify this projection component 401 of the Earth's rotational velocity vector and to correct the measurements accordingly.

In practice, a rotation sensor 112a, 112b, the first and the second gyrometers in the example, cannot be installed with its sensitive axis perfectly orthogonal to the real axis of rotation 204. The orthogonality error of this rotation sensor 112*a*, 112*b* with the real axis of rotation 204 has thus be taken into account. For that purpose, the invention includes identifying this orthogonality error and correcting the measurements accordingly.

The same applies to the potential orthogonality error between the sensitive axes of the first 112*a* and the second 112*b* gyrometers.

In practice, the third rotation sensor 112*c*, which can be a gyrometer, cannot be installed in perfect alignment with the real axis of rotation 204. The alignment error of this rotation sensor with the real axis of rotation 204 can also be taken into account, but in practice, this error, which is generally small, is neglected.

It is to be noted that the metrology device may incorporate two elements for the third rotation sensor: a gyrometer and a specific measurement system to obtain via two means the angular rotational velocity and the angular position of the rotary element, for example an angular encoder.

The device 100 implemented within the framework of the invention incorporates rotation sensors 112*a*, 112*b*, 112*c*, preferably gyrometers integral with the rotary element 101, i.e. attached to the rotary element. It is to be noted that, when it is indicated that the gyrometers are integral with or attached to the rotary element, these attachments may be direct or indirect and in these latter cases, they are attached to a measurement table driven in rotation by the rotary element.

In an embodiment, two rotation sensors, a first and a second rotation sensors, are installed on the rotary element in such a way that their measurement axes (sensitive axes in the case of gyrometers) are orthogonal to one another and both orthogonal to the real axis of rotation 204 of the rotary element 101. These rotation sensors may in particular be independent gyrometers or the gyrometers of an inertial unit.

Moreover, a third rotation sensor integral with the rotary axis 101 is installed in such a way that its measurement axis (sensitive axis in the case of a gyrometer) is aligned with the real axis of rotation 204 of the rotary element 101. This third rotation sensor may in particular be an independent gyrometer or the third gyrometer of the above-mentioned inertial unit that conventionally incorporates three gyrometers, the inertial unit being configured to produce measurements according to an orthonormal trihedron.

It is to be noted that the invention is applicable to an inertial unit whose gyrometers are not necessarily aligned along an orthonormal trihedron, for example the gyrometers are arranged in a pyramid shape inside the inertial unit. An inertial unit can thus be used without worrying about the direction of the sensitive axes of the gyrometers inside the inertial unit. It will be seen that it is possible to do without gyrometer for the third rotation sensor but it is necessary to have a specific measurement system for obtaining directly or via calculations the angular position $\theta(t)$ and the angular velocity $\dot{\theta}(t)$ of the rotary element. It is indeed necessary to know the angular position $\theta(t)$ and the angular velocity $\dot{\theta}(t)$ of the rotary element to calculate in space (and even in time) the angular errors of inclination of the real axis of rotation and thereafter the precise orientation of the real axis of rotation of the rotary element, including the North alignment of the real axis of rotation and/or the inclination between the real axis of rotation and a determined reference axis, in particular its reference axis.

In practice, such a specific measurement system will generally be associated with a third gyrometer because an inertial unit or an inertial measurement unit is generally implemented, which comes with three gyrometers as standard, and two sources (the gyrometer and the specific measurement system) will be available to obtain the angular position $\theta(t)$ and the angular velocity $\dot{\theta}(t)$ of the rotary element.

The specific measurement system enabling to obtain the angular position $\theta(t)$ and the angular velocity $\dot{\theta}(t)$ of the rotary element other than a gyrometer is a rotation sensor integral with a fixed portion of the frame 201 of the equipment and that measures the rotation of the rotary element 101 about its real axis of rotation 204. This specific measurement system can in particular be an optical encoder, an inductive encoder, a magnetic encoder, an interferometric rotation measurement system, this specific measurement system can further incorporate calculation means to produce in particular an angular velocity measurement from the angular position. In certain modalities, the specific measurement system is consisted of two sensors, one for the angular position and one for the angular velocity.

The device 100 of the invention also incorporates control electronics 111 that controls the rotary element 101 according to the determined instructions.

The device 100 according to the invention also incorporates an acquisition unit 113 making the synchronous acquisition of the measurements made by the rotation sensors 112*a*, 112*b*, 112*c* and the potential specific measurement system and enables to store the measurements as data in a memory 114.

Indeed, in order to characterize the rotary element 101, it is necessary to obtain measurements over several turns of the rotary element and preferably for several values of rotation velocities of said rotary element. Moreover, in order to increase the precision of the results, it is advantageous to average the measurement results to reduce and eliminate the random effects. In practice, the measurement/data collection may last from a few seconds to a few hours, the final characterization calculations being themselves very fast with the computer means available inside the device or outside the device.

In one embodiment in which the characterization is made within the device, the latter incorporates a computer processing unit 115 (Digital Processing Unit/DSP and/or microprocessor) using the measurement/data in memory 114 to calculate the angular errors of inclination of the real axis of rotation and, afterwards, in particular the precise orientation of the real axis of rotation, including North alignment of the rotary element or inclination of the real axis of rotation with respect to a reference axis.

Once these characterization data of the rotary element obtained during a characterization phase of the rotary element, they can be used during normal operation (metrology phase in the case of a metrology equipment) of the equipment incorporating this rotary element to carry out corrections in real time. These characterization data are thus advantageously memorized in the equipment for a latter use by the control electronics 111 that controls the rotary element 101 so that the equipment operates according to the determined instructions that are provided to it by eliminating the errors due to the misalignment between the real axis of rotation and the reference axis. These stored characterization data can also be used to correct measurements made on a device set in motion by the metrology equipment rotary element.

During the characterization phase, the control electronics 111 that controls the rotary element 101 receives instructions for the rotary element to carry out at least one series of periodic oscillations during which measurements are acquired. These periodic oscillations may be for example an angular oscillation, e.g. of sinusoidal form. Another form of periodic oscillation is possible, but there must be continuity of angular velocity and position. These periodic oscillations lead to reversals in the direction of rotation of the rotary element.

The equipment is therefore initially used in a characterization phase of the rotary element, which consists of collecting measurements and then characterizing the rotary element. The calculated characterization data obtained are therefore stored in the equipment for later use in metrology phases corresponding to the usual use of the equipment. It is understood that calculations on measurements/data during the characterization phase can be carried out within the equipment or in an external storage and calculation system, the latter case in particular if this phase is carried out only once at the end of equipment manufacture.

The characterization phase can be carried out only at the end of the equipment manufacture, and not repeated subsequently. However, it may be advantageous to repeat a characterization phase from time to time, as a change in characterization data may be an early warning sign of an equipment fault, and therefore be used in a failure prediction process.

In certain implementation modes, it is envisaged that characterization is carried out in pseudo-real time, at the same time as the usual use of the equipment, with the characterization data updated periodically during the time of use.

Referring to FIG. 5, the steps implemented during the characterization phase will now be detailed, according to a first mode of presentation breaking down the steps.

As indicated, it is advantageous to average the measurements/data obtained to reduce/suppress the random or even periodic effects. The averaging is carried out over a given number of measurement sequences with periodic oscillations, advantageously sinusoidal, whose amplitude and period characteristics are identical (the sequences are repeated with a same periodic oscillation).

Using the stored measurements/data, advantageously averaged, the orthogonality errors of the rotation sensors are identified, in order to be able to subsequently correct these measurements/data of the rotation sensors from the components resulting from the orthogonality errors. This identification and correction are carried out for the first and the second gyrometers.

With the measurements/data corrected for the orthogonality errors, the amplitude of the Earth's rotational velocity vector projection and the initial headings of the rotation sensors are then estimated. The North alignment of the real axis of rotation can then be determined, which enables to eliminate the Earth's rotation component from the measurements made by the gyrometers.

Moreover, the calculations can be continued to obtain the inclination of the real axis of rotation with respect to the reference axis. For that purpose, the measurements made by the rotation sensors are corrected for the components resulting from the projections of the Earth's rotational velocity vector onto the rotation sensors, then the measurements of the rotation sensors are integrated to obtain the two components of angular error of inclination of the rotary element, i.e. the inclination between the real axis of rotation 204 and the reference axis 203 and corresponding to two errors of inclination about two axes which are orthogonal to one another and both orthogonal to the reference axis 203 as mentioned hereinabove.

Returning to the device 100 of FIG. 1 which corresponds to an embodiment of the invention, the measurement device 100 of the rotary element equipment incorporating control electronics 111, rotation sensors 112*a*, 112*b*, 112*c*, an acquisition unit 113, a memory 114 for storing the measurements and a calculation/processing unit 115 for processing the measurements/data. The control unit 111 interacts bilaterally with a precise rotary axis 101 to control the latter, for example in closed loop. The control unit 111 also interacts bilaterally with the calculation unit 115, for example, to receive instructions and to send a result in return. The calculation unit 115 reads the measurements/data in memory 114 of the device 100, which receives them from the acquisition unit 113 of the rotation sensors 112*a*, 112*b*, 112*c* of the rotary element 101.

The modalities of calculation of the "wobble" (warp or offset) in the case of a vertical rotary element, by way of example, i.e. aligned along z-axis, which is thus the reference axis, will now be described according to a second mode of presentation.

In this example, three rotation sensors are implemented and these are three gyrometers enabling measurements of angular velocities in the x-y plane and along z-axis and which are attached to the rotary element that is assumed to be vertical. The three gyrometers are fixed and their sensitive axes are oriented with reference to the real axis of rotation of the rotary element.

Hereinafter, the following notations are used, wherein the x, y and z axes are the axes of a reference frame of a test plate in the application in relation with FIG. 6:

$\Omega$: Earth's rotational velocity (rad/s)

L: Equipment latitude (rad)

$\theta$: Angular position of the vertical rotary element with respect to North (rad)

$\theta'$: Angular rotational velocity of the vertical rotary element in the equipment assumed to be stationary on Earth $m_{1z}$: Misalignment of the x-axis gyrometer with respect to z-axis $m_{2z}$: Misalignment of the y-axis gyrometer with respect to z-axis the $m_{1z}$ and $m_{2z}$ corresponding to the orthogonality errors of the sensitive/measurement axes of the gyrometers $b_x$, $b_y$, $b_z$: Bias of the gyrometers along the x, y, z axes $w_x$, $w_y$: Parasitic velocities resulting from the "wobble" effect perceived on the x-axis and y-axis gyrometers $\alpha_x$, $\alpha_y$: "Wobble" angles along x-axis and y-axis ($\alpha\_z$ along z-axis)

the angles $\alpha_x$, $\alpha_y(\alpha_z)$ in space are schematized by a in FIG. 2, which is in two dimensions $g_x$, $g_y$, $g_z$: Measurements of the gyrometers along the x, y, z axes The calculations implemented enable to correct the measurements by eliminating, or at least reducing, the biases of the gyrometers, the effects of the Earth's rotation projection on the gyrometer measurements, the misalignments of the gyrometers between each other.

The gyrometer biases are reduced/suppressed by averaging the measurements. Measurement averaging is thus carried out during or after the measurements, at the beginning of the characterization phase. Once this bias correction obtained, it remains on the measurement/sensitive axes perpendicular to the real axis of rotation, a residual velocity that corresponds to the Earth's rotation projection and to the "wobble" effect and the calculations will enable to determine this later effect and thus to characterize the rotary element.

It is considered that the local geographical trihedron is such that z-axis points upward, x-axis towards the North, and y-axis towards the West. It is also assumed that the equipment reference frame is the local geographical trihedron, which may be easily achieved by "northing" the equipment. If the latter operation is not carried out, the resulting offset will be taken into account in the calculations.

In this reference frame, the Earth's projection, denoted $v_{terre\_GEO}$ is $$v_{terre\_GEO} = \begin{pmatrix} \Omega\cos L \\ 0 \\ \Omega\sin L \end{pmatrix}$$

Assuming that the axis is not affected by the "wobble" and that the reference frame of the gyrometers placed on the equipment rotary element is aligned with the local geographical reference frame when the position of the axis is zero ($\theta=0$), under these simplifying assumptions:

$$\begin{pmatrix} g_x \\ g_y \\ g_z \end{pmatrix} = \begin{pmatrix} 0 \\ 0 \\ \dot\theta \end{pmatrix} + \begin{pmatrix} \cos\theta & \sin\theta & 0 \\ -\sin\theta & \cos\theta & 0 \\ 0 & 0 & 1 \end{pmatrix} \begin{pmatrix} \Omega\cos L \\ 0 \\ \Omega\sin L \end{pmatrix} + \begin{pmatrix} b_x \\ b_y \\ b_z \end{pmatrix}$$

In practice, the gyrometers are not perfectly aligned and the reference frame of the gyrometers is deduced from the equipment reference frame by means of a passage matrix. Given the use made here of gyrometer measurements, this transition matrix $M_{mes}$ from the equipment reference frame to the gyrometer reference frame can be expressed by $$M_{mes} \approx \begin{bmatrix} 1 & 0 & m_{1z} \\ 0 & 1 & m_{2z} \\ 0 & 0 & 1 \end{bmatrix}$$

Taking into account theses "misalignments", the gyrometer measurements are expressed according to:

$$\begin{pmatrix} g_x \\ g_y \\ g_z \end{pmatrix} = \begin{bmatrix} 1 & 0 & m_{1z} \\ 0 & 1 & m_{2z} \\ 0 & 0 & 1 \end{bmatrix} \begin{pmatrix} 0 \\ 0 \\ \dot\theta \end{pmatrix} + \begin{pmatrix} \cos\theta & \sin\theta & 0 \\ -\sin\theta & \cos\theta & 0 \\ 0 & 0 & 1 \end{pmatrix} \begin{pmatrix} \Omega\cos L \\ 0 \\ \Omega\sin L \end{pmatrix} + \begin{pmatrix} b_x \\ b_y \\ b_z \end{pmatrix}$$

Now, Taking into Account the "Wobble" Effects on x-Axis and y-Axis, we Obtain:

$$\begin{pmatrix} g_x \\ g_y \\ g_z \end{pmatrix} = \begin{bmatrix} w_x \\ w_y \\ 0 \end{bmatrix} + \begin{bmatrix} 1 & 0 & m_{1z} \\ 0 & 1 & m_{2z} \\ 0 & 0 & 1 \end{bmatrix} \begin{pmatrix} 0 \\ 0 \\ \dot\theta \end{pmatrix} + \begin{pmatrix} \cos\theta & \sin\theta & 0 \\ -\sin\theta & \cos\theta & 0 \\ 0 & 0 & 1 \end{pmatrix} \begin{pmatrix} \Omega\cos L \\ 0 \\ \Omega\sin L \end{pmatrix} + \begin{pmatrix} b_x \\ b_y \\ b_z \end{pmatrix}$$

Which May be Rewritten:

$$\begin{pmatrix} g_x \\ g_y \\ g_z \end{pmatrix} = \begin{bmatrix} w_x \\ w_y \\ 0 \end{bmatrix} + \begin{bmatrix} 1 & 0 & m_{1z} \\ 0 & 1 & m_{2z} \\ 0 & 0 & 1 \end{bmatrix} \begin{bmatrix} \Omega\cos\theta\cos L \\ -\Omega\sin\theta\cos L \\ \Omega\sin L + \dot\theta \end{bmatrix} + \begin{pmatrix} b_x \\ b_y \\ b_z \end{pmatrix}$$

And Finally:

$$\begin{pmatrix} g_x \\ g_y \\ g_z \end{pmatrix} = \begin{bmatrix} w_x \\ w_y \\ 0 \end{bmatrix} + \begin{bmatrix} \Omega\cos\theta\cos L + m_{1z}(\Omega\sin L + \dot\theta) \\ -\Omega\sin\theta\cos L + m_{2z}(\Omega\sin L + \dot\theta) \\ \Omega\sin L + \dot\theta \end{bmatrix} + \begin{pmatrix} b_x \\ b_y \\ b_z \end{pmatrix}$$

Moreover, $\Omega$, L are known.

Likewise, the angular position $\theta(t)$ of the rotary element and the angular velocity $\dot\theta(t)$ of the rotary element are known at each time instant t, either directly through the implementation of one or more specific measurement devices (i.e. non-gyrometric), including specific calculations (including the derivation, as the velocity can be calculated from specific measurements of position), or using the gyrometer measurement $g_z(t)$ along z-axis. The measurements $g_z(t)$ along z-axis are therefore not necessary for a vertical rotary element if the angular position $\theta(t)$ of the rotary element and the angular velocity $\dot\theta(t)$ of the rotary element can be known by another manner than $b_y$ a z-axis gyrometer. Therefore, in the case of a vertical rotary element, it is possible to use only two gyrometers, along x-axis and y-axis, and at least one specific measurement system for the angular position $\theta(t)$ and the angular velocity $\dot\theta(t)$.

Note that for z-axis, it is possible to use only one gyrometer that gives the rotational velocity, since integrating the z-axis gyrometer velocity gives a position, but the later has the disadvantage of being within one constant. A means for recalibrating the position must therefore be implemented, either $b_y$ calculation or by another sensor indexing a given rotational position.

In practice, two sensors will thus be used for z-axis, advantageously a gyrometer and a means for obtaining the rotational position of the rotary element.

Moreover, the angular velocity $\dot\theta(t)$ of the axis is (almost all the time) much higher than the quantity $\Omega \sin L$, i.e. $|\dot\theta(t)| \gg \Omega \sin L$, and the term $\Omega \sin L$ negligible relative to $\dot\theta(t)$ can be considered. Therefore:

$$\begin{pmatrix} g_x \\ g_y \\ g_z \end{pmatrix} = \begin{bmatrix} w_x \\ w_y \\ 0 \end{bmatrix} + \begin{bmatrix} \Omega\cos\theta\cos L + m_{1z} \cdot \dot\theta \\ -\Omega\sin\theta\cos L + m_{2z} \cdot \dot\theta \\ \dot\theta \end{bmatrix} + \begin{pmatrix} b_x \\ b_y \\ b_z \end{pmatrix}$$

Considering the equations giving $g_x(t)$ and $g_y(t)$, at each time instant t it can be seen that the velocities due to the "wobble" can be deduced at each time instant $w_x(t)$, $w_y(t)$ by the relations:

$$w_x(t) = g_x(t) - \Omega\cos\theta(t)\cos L - m_{1z} \cdot \dot\theta(t) - b_x$$

$$w_y(t) = g_y(t) + \Omega\sin\theta(t)\cos L - m_{2z} \cdot \dot\theta(t) - b_y$$

The North alignment of the axis (here vertical) is made using the velocities measured $b_y$ the x-axis and y-axis gyrometers, during static phases corresponding to $\dot\theta=0$. Let's $\theta_c$ be the angular position measured by the encoder, and $\delta$ the distance from the North, such that $\theta=\theta_c+\delta$ when $\dot\theta=0$, then $$g_x = \Omega\cos(\theta_c + \delta)\cos L + b_x$$

$$g_y = -\Omega\sin(\theta_c + \delta)\cos L + b_y$$

$\theta_c$ is known because it is measured and also $$g_x = \Omega \cos L(\cos(\theta_c)\cos(\delta) - \sin(\theta_c)\sin(\delta)) + b_x$$

$$g_y = -\Omega \cos L(\sin(\theta_c)\cos(\delta) + \cos(\theta_c)\sin(\delta)) + b_y$$

Therefore, for example using four static positions such that $\theta_c=[0°; 90°; 180°; 270°]$, it is possible to estimate the parameters $\cos \delta$, $\sin \delta$, $b_x$, $b_y$ by means of a linear regression, because $g_x$ and $g_y$ linearly depend on these four parameters.

In these last two equations, the terms $g_x(t)$, $g_y(t)$ are known at each time instant by acquiring information from the x-axis and y-axis gyrometers, the terms $\Omega \cos \theta(t) \cos L$ and $\Omega \sin \theta(t) \cos L$ are also known due to the fact that $\theta(t)$ is known directly (by specific measurement device(s), and possibly calculations from said measurements) or indirectly using the measurement $g_z(t)$.

Moreover, the terms $m_{1z}$, $m_{2z}$ and $b_x$, $b_y$ are identifiable and can be estimated for example by means of a simple linear regression (least squares), whereas $\dot{\theta}(t)$ is known directly (by specific measurement device(s), and possibly calculations from said measurements) or indirectly using the measurement $g_z(t)$.

By definition of the "wobble", the "wobble" angles $\alpha_x(t)$, $\alpha_y(t)$ as a function of time obey the very simple differential equations $$\dot{\alpha}_x(t) = w_x(t)$$

$$\dot{\alpha}_y(t) = w_y(t)$$

But as $\theta$ is known at each time instant t, the "wobble" angles may be expressed directly as a function of the angular position $\theta$ or $\theta_c$ of the equipment rotary element, i.e. express $\alpha_x(\theta)$, $\alpha_y(\theta)$ or $\alpha_x(\theta_c)$, $\alpha_y(\theta_c)$.

These principles can be applied to the cases of the horizontal rotary elements having a "wobble". To simplify the calculations, the horizontal rotary element may be aligned with x-axis or y-axis, which will then be the reference axis. Compared with previous calculations, the projection of the Earth's rotational velocity onto the precise axis must be taken into account, and a z-axis gyrometer must therefore be used to obtain the measurement $g_z(t)$. As regards the rotary element gyrometer (=the third rotation sensor), which is along x-axis or y-axis according to the case, it may be contemplated to add or replace it with specific sensor(s) to obtain the angular position $\theta(t)$ and the angular velocity $\dot{\theta}(t)$ of the rotary element.

In the calculation formulas for horizontal rotary elements, we will take into account the fact that the parasitic velocities resulting from the "wobble" effect perceived on the gyrometers will then concern the two other axes (x or y and z) which are not along the rotary element (the rotary element being y or x, respectively). It is the same for the "wobble" angle. For example, if the rotary element is aligned along x (reference axis), then the parasitic velocities resulting from the "wobble" effect are perceived on the y-axis and z-axis gyrometer ($w_y$, $w_z$) and the "wobble" angles are on y-axis and z-axis ($\alpha_y$, $\alpha_z$).

The previous exemplary embodiment uses simplified calculations, thanks to a choice of particular orientations for the equipment and the vertical or horizontal rotary element, but it is clear that it is possible to use other orientations, in which case these will be taken into account in the calculations.

The invention claimed is:

1. A device (100) for measuring and estimating angular errors of inclination $\alpha_x(\theta)$, $\alpha_y(\theta)$ of a real axis of rotation (204) of a rotary element (101) in relation to a reference axis (203), the rotary element (101) being installed in metrology or machining equipment in such a way that its real axis of rotation (204) is aligned as closely as possible with the reference axis (203), the real axis of rotation (204), in relation to the reference axis (203), having an inclination that is variable as a function of the angular position $\theta$ of the rotary element about its real axis of rotation (204) or "wobble", the device including:

control electronics (111) for controlling the rotation of the rotary element (101) about its real axis of rotation (204);

a first and a second rotation sensors (112a, 112b) for obtaining respectively angular velocities of the rotary element (101), about two measurement axes (302, 402) which are orthogonal to one another and both orthogonal to the real axis of rotation (204);

a third rotation sensor (112c) for obtaining the angular position and the angular velocity of the rotary element (101) about its real axis of rotation (204), at least two of the above-mentioned sensors being inertial and enabling to obtain projections of the Earth's rotational velocity vector onto at least two projection axes;

an acquisition unit (113) configured to acquire measurements made by the above-mentioned sensors while the rotary element carries out at least one series of periodic oscillations resulting in reversals of the direction of rotation of the rotary element;

a memory (114) for storing the measurements of the above-mentioned sensors;

a calculation unit (115) configured to calculate, from the angular velocities and positions obtained from the above-mentioned sensors, the angular errors of inclination $\alpha_x(\theta)$, $\alpha_y(\theta)$ of the real axis of rotation (204) of the rotary element (101) in relation to the reference axis (203)

and as a function of the angular position $\theta$ of the rotary element (101) about its real axis of rotation (204).

2. The device according to claim 1, wherein the first and second rotation sensors (112a, 112b) each incorporate a gyrometer integral with the rotary element (101) and the third rotation sensor (112c) incorporates a gyrometer integral with the rotary element (101) and installed in such a way that its sensitive axis is aligned with the real axis of rotation and the calculation unit (115) is configured to calculate the angular rotational velocity and the angular position of the rotary element (101) based on measurements of the third rotation sensor (112c).

3. The device according to claim 1, wherein the calculation unit (115) is configured to calculate, from the measurements of the rotation sensors, an inclination angle ($\alpha$, $\alpha_x$, $\alpha_y$) between the real axis of rotation (204) and the reference axis (203).

4. The device according to claim 1, wherein at least two of the three rotation sensors incorporate a gyrometer.

5. The device according to claim 4, wherein the first and second rotation sensors (112a, 112b) each incorporate a gyrometer integral with the rotary element (101) and the third rotation sensor is a specific measurement system enabling to produce directly and/or via calculations the angular rotational velocity and the angular position of the rotary element (101), said specific measurement system being integral with a fixed part of equipment incorporating the rotary element (101).

6. The device according to claim 4, wherein the first and second rotation sensors (112*a*, 112*b*) each incorporate a gyrometer integral with the rotary element (101) and wherein the device incorporates a third rotation sensor (112*c*) incorporating a gyrometer and a specific measurement system, the gyrometer of the third rotation sensor (112*c*) being arranged in such a way that its sensitive axis is aligned with the real axis of rotation and the calculation unit (115) being configured to calculate at least one of the angular rotational velocity and the angular position of the rotary element (101) based on measurements of the gyrometer of the third rotation sensor (112*c*), and said specific measurement system enables to produce directly and/or via calculations at least one of the angular rotational velocity and the angular position of the rotary element (101), said specific measurement system being integral with a fixed part of equipment incorporating the rotary element (101) and wherein the calculation unit (115) is configured to use the angular rotational velocities and the angular positions of the rotary element (101) obtained from measurements of the gyrometer of the third rotation sensor (112*c*) and the specific measurement system.

7. The device according to claim 4, wherein the first and second rotation sensors (112*a*, 112*b*) each incorporate a gyrometer integral with the rotary element (101) and the third rotation sensor (112*c*) incorporates a gyrometer integral with the rotary element (101) and installed in such a way that its sensitive axis is aligned with the real axis of rotation and the calculation unit (115) is configured to calculate the angular rotational velocity and the angular position of the rotary element (101) based on measurements of the third rotation sensor (112*c*).

8. The device according to claim 7, wherein the calculation unit (115) is configured to calculate, from the measurements of the rotation sensors, an inclination angle ($\alpha$, $\alpha_x$, $\alpha_y$) between the real axis of rotation (204) and the reference axis (203).

9. The device according to claim 4, wherein said at least two inertial sensors that enable to obtain the projections of the Earth's rotational velocity vector onto at least two projection axes are the first and the second rotation sensors and the two measurement axes (302, 402) of the first and the second rotation sensors are merged with said at least two projection axes.

10. The device according to claim 9, wherein the first and second rotation sensors (112*a*, 112*b*) each incorporate a gyrometer integral with the rotary element (101) and wherein the device incorporates a third rotation sensor (112*c*) incorporating a gyrometer and a specific measurement system, the gyrometer of the third rotation sensor (112*c*) being arranged in such a way that its sensitive axis is aligned with the real axis of rotation and the calculation unit (115) being configured to calculate at least one of the angular rotational velocity and the angular position of the rotary element (101) based on measurements of the gyrometer of the third rotation sensor (112*c*), and said specific measurement system enables to produce directly and/or via calculations at least one of the angular rotational velocity and the angular position of the rotary element (101), said specific measurement system being integral with a fixed part of equipment incorporating the rotary element (101) and wherein the calculation unit (115) is configured to use the angular rotational velocities and the angular positions of the rotary element (101) obtained from measurements of the gyrometer of the third rotation sensor (112*c*) and the specific measurement system.

11. The device according to claim 9, wherein the calculation unit (115) is configured to calculate, from the measurements of the rotation sensors, an inclination angle ($\alpha$, $\alpha_x$, $\alpha_y$) between the real axis of rotation (204) and the reference axis (203).

12. The device according to claim 9, wherein the first and second rotation sensors (112*a*, 112*b*) each incorporate a gyrometer integral with the rotary element (101) and the third rotation sensor is a specific measurement system enabling to produce directly and/or via calculations the angular rotational velocity and the angular position of the rotary element (101), said specific measurement system being integral with a fixed part of equipment incorporating the rotary element (101).

13. The device according to claim 12, wherein the calculation unit (115) is configured to calculate, from the measurements of the rotation sensors, an inclination angle ($\alpha$, $\alpha_x$, $\alpha_y$) between the real axis of rotation (204) and the reference axis (203).

14. A method for measuring and estimating angular errors of inclination $\alpha_x(\theta)$, $\alpha_y(\theta)$ of a real axis of rotation (204) of a rotary element (101) in relation to a reference axis (203), the rotary element (101) being installed in metrology or machining equipment in such a way that its real axis of rotation is aligned as closely as possible with the reference axis (203), the real axis of rotation (204), in relation to the reference axis (203), having an inclination that is variable as a function of the angular position $\theta$ of the rotary element (101) about its real axis of rotation (204) or "wobble", including the following steps:

measuring the angular velocities of the rotary element (101) about two measurement axes (302, 402) which are orthogonal to one another and both orthogonal to the real axis of rotation (204);

measuring the angular position and the angular velocity of the rotary element (101) about its real axis of rotation (204);

measuring the projections of the Earth's rotational velocity onto at least two projection axes;

said measurements being made while the rotary element carries out at least one series of periodic oscillations resulting in reversals of the direction of rotation of the rotary element;

calculating, from measurements made at the previous steps, the angular errors of inclination $\alpha_x(\theta)$, $\alpha_y(\theta)$ of the real axis of rotation (204) of the rotary element (101) in relation to the reference axis (203) and as a function of the angular position $\theta$ of the rotary element (101) about its real axis of rotation (204).

15. The method according to claim 14, wherein a first, a second and a third rotation sensors, which are three gyrometers, are implemented, the real axis of rotation being aligned along a vertical reference z-axis of an orthonormal trihedron of axes x, y, z, the first $g_x$ the second $g_y$ and the third $g_z$ gyrometers carrying out measurements along the axes x, y, z, respectively, and wherein velocities $w_x$, $w_y$ due to the inclination between the reference axis and the real axis of rotation are calculated by the relations:

$$w_x(t) = g_x(t) - \Omega\cos\theta(t)\cos L - m_{1z} \cdot \dot{\theta}(t) - b_x$$

$$w_y(t) = g_y(t) + \Omega\sin\theta(t)\cos L - m_{2z} \cdot \dot{\theta}(t) - b_y$$

where
Ω is the Earth's rotational velocity,
L is the latitude of equipment incorporating the rotary element,
θ is the angular position of the rotary element about its real axis of rotation with respect to the North,
$\dot{\theta}$ is the angular velocity of the rotary element about the real axis of rotation,
$m_{1z}$ is the misalignment of the x-axis gyrometer with respect to z-axis,
$m_{2z}$ is the misalignment of the y-axis gyrometer with respect to z-axis,
$b_x$, $b_y$ the gyrometer biases along x-axis and y-axis,
the identifiable terms $m_{1z}$, $m_{2z}$ and $b_x$, $b_y$ being estimated,
the inclination angles $\alpha_x(\theta)$, $\alpha_y(\theta)$ between the reference axis and the real axis of rotation as a function of the angular position θ of the rotary element about its real axis of rotation being obtained by implementation of the differential equations:

$$\dot{\alpha}_x(t) = w_x(t)$$

$$\dot{\alpha}_y(t) = w_y(t).$$

16. The method according to claim 14, wherein the projection axes on which the Earth's rotational velocity is measured are merged with at least two axes among the two measurement axes (302, 402) and the real axis of rotation (204).

17. The method according to claim 14, further including the following steps:
carrying out periodic measurements at determined rotational velocities of the rotary element;
averaging the periodic measurements;
deducing therefrom errors of orthogonality of the two sensitive axes (302, 402);
correcting the measurements of the angular velocities of the rotary element (101) about two axes of measurement (302, 402) for components resulting from the identified errors of orthogonality.

18. The method according to claim 17, wherein a first, a second and a third rotation sensors, which are three gyrometers, are implemented, the real axis of rotation being aligned along a vertical reference z-axis of an orthonormal trihedron of axes x, y, z, the first $g_x$ the second $g_y$ and the third $g_z$ gyrometers carrying out measurements along the axes x, y, z, respectively, and wherein velocities $w_x$, $w_y$ due to the inclination between the reference axis and the real axis of rotation are calculated by the relations:

$$w_x(t) = g_x(t) - \Omega\cos\theta(t)\cos L - m_{1z} \cdot \dot{\theta}(t) - b_x$$

$$w_y(t) = g_y(t) + \Omega\sin\theta(t)\cos L - m_{2z} \cdot \dot{\theta}(t) - b_y$$

where
Ω is the Earth's rotational velocity,
L is the latitude of equipment incorporating the rotary element,
θ is the angular position of the rotary element about its real axis of rotation with respect to the North,
$\dot{\theta}$ is the angular velocity of the rotary element about the real axis of rotation,
$m_{1z}$ is the misalignment of the x-axis gyrometer with respect to z-axis,
$m_{2z}$ is the misalignment of the y-axis gyrometer with respect to z-axis, $b_x$, $b_y$ the gyrometer biases along x-axis and y-axis,
the identifiable terms $m_{1z}$, $m_{2z}$ an$b_x$, $b_y$ being estimated,
the inclination angles $\alpha_x(\theta)$, $\alpha_y(\theta)$ between the reference axis and the real axis of rotation as a function of the angular position θ of the rotary element about its real axis of rotation being obtained by implementation of the differential equations:

$$\dot{\alpha}_x(t) = w_x(t)$$

$$\dot{\alpha}_y(t) = w_y(t).$$

19. The method according to claim 17, including a step of correcting the measurements of the angular velocities of the rotary element (101) about the axes of measurement (302, 402) of the components resulting from the projections of the Earth's rotational velocity vector and integrating said so-corrected measurements of the angular velocities to calculate the angular errors of inclination of the real axis of rotation (204) of the rotary element (101) in relation to the reference axis (203) and as a function of the angular position θ of the rotary element about its real axis of rotation.

20. The method according to claim 19, wherein a first, a second and a third rotation sensors, which are three gyrometers, are implemented, the real axis of rotation being aligned along a vertical reference z-axis of an orthonormal trihedron of axes x, y, z, the first $g_x$ the second $g_y$ and the third $g_z$ gyrometers carrying out measurements along the axes x, y, z, respectively, and wherein velocities $w_x$, $w_y$ due to the inclination between the reference axis and the real axis of rotation are calculated by the relations:

$$w_x(t) = g_x(t) - \Omega\cos\theta(t)\cos L - m_{1z} \cdot \dot{\theta}(t) - b_x$$

$$w_y(t) = g_y(t) + \Omega\sin\theta(t)\cos L - m_{2z} \cdot \dot{\theta}(t) - b_y$$

where
Ω is the Earth's rotational velocity,
L is the latitude of equipment incorporating the rotary element,
θ is the angular position of the rotary element about its real axis of rotation with respect to the North,
$\dot{\theta}$ is the angular velocity of the rotary element about the real axis of rotation,
$m_{1z}$ is the misalignment of the x-axis gyrometer with respect to z-axis,
$m_{2z}$ is the misalignment of the y-axis gyrometer with respect to z-axis,
$b_x$, $b_y$ the gyrometer biases along x-axis and y-axis,
the identifiable terms $m_{1z}$, $m_{2z}$ and $b_x$, $b_y$ being estimated,
the inclination angles $\alpha_x(\theta)$, $\alpha_y(\theta)$ between the reference axis and the real axis of rotation as a function of the angular position θ of the rotary element about its real axis of rotation being obtained by implementation of the differential equations:

$$\dot{\alpha}_x(t) = w_x(t)$$

$$\dot{\alpha}_y(t) = w_y(t).$$

* * * * *